March 7, 1961
M. HEGNER
2,973,899
ARRANGEMENT FOR THE REMOTE MEASURING OF THE INCREASE
DURING A PREDETERMINED PERIOD OF THE NUMBER
GIVEN OUT BY AN IMPULSE-CONTROLLED METER
Filed Aug. 6, 1956
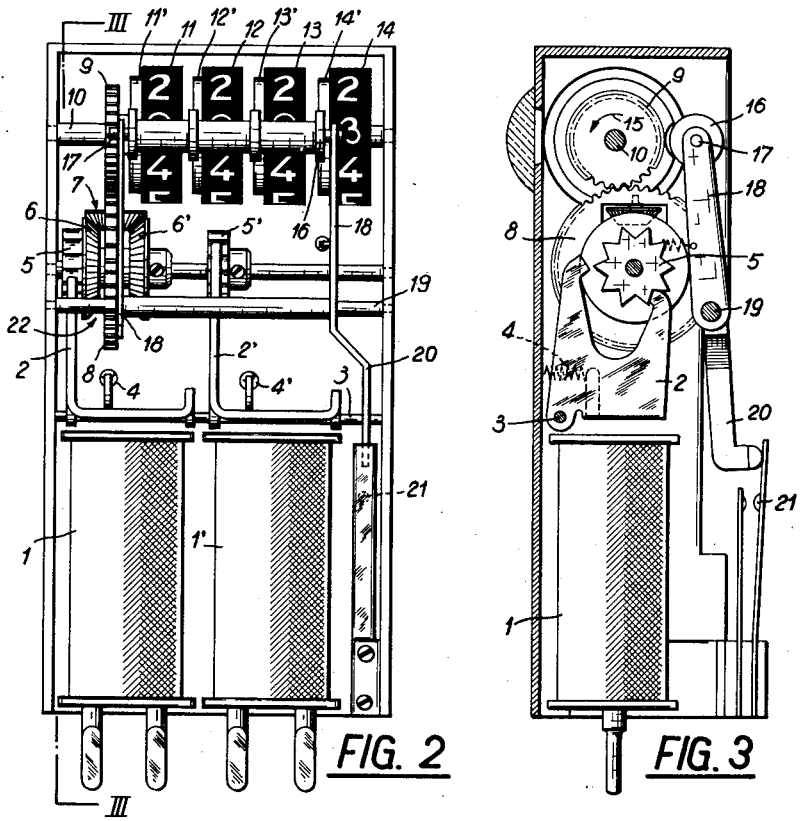
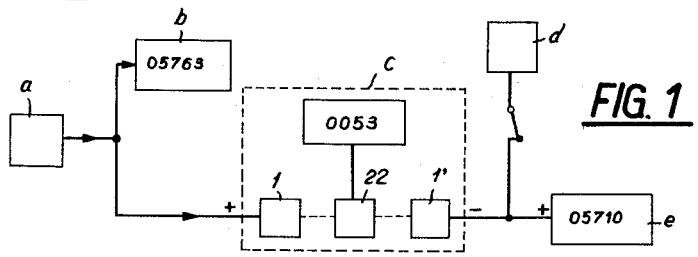
Inventor:
Max HEGNER
by: J Delater-Syny
Attorney United States Patent Office 2,973,899
Patented Mar. 7, 1961

2,973,899

ARRANGEMENT FOR THE REMOTE MEASURING OF THE INCREASE DURING A PREDETERMINED PERIOD OF THE NUMBER GIVEN OUT BY AN IMPULSE-CONTROLLED METER

Max Hegner, Geneva, Switzerland, assignor to Sodeco Societe des Compteurs de Geneve, Geneva, Switzerland, a firm Filed Aug. 6, 1956, Ser. No. 602,393

Claims priority, application Switzerland Aug. 9, 1955

2 Claims. (Cl. 235—92)

My invention relates to an arrangement for the remote measuring of the increase during a predetermined period of the number given out by an impulse-controlled meter.

According to my invention, the metering impulses are transmitted simultaneously to at least one intermediate differential meter, the gearwork of which is at zero at the beginning of any metering period while an independent impulse transmitter connected on the one hand with said differential meter and on the other hand with a remote counting or metering instrument is adapted to furnish both the remote instrument and the differential meter at the end of the metering period with a number of impulses which is equal to that of the metering impulses transmitted to the differential meter during said period, so as to simultaneously return to zero the gearwork and increase the numeric indication of the remote metering instrument by a corresponding amount.

I have illustrated by way of example in the accompanying drawing a preferred embodiment of my invention. In said drawing:

Fig. 1 is a diagrammatic showing of said embodiment;

Fig. 2 is a detailed elevational view of said embodiment;

Fig. 3 is a cross-section thereof through line III—III of Fig. 2.

The impulses transmitted by the consumption meter $a$ of the subscriber control on the one hand a first meter $b$ the gearwork of which carries a numeric indication proportional to the total number of impulses, say 5763, and on the other hand an intermediate differential meter $c$ the gearwork of which is at zero at the beginning of any metering period.

The differential meter $c$ includes two windings 1 and 1', each of which when it is fed with current attracts the corresponding metal armature, 2 or 2' respectively, said armatures being pivotally secured at 3 (Fig. 2) and subjected to the action of corresponding springs 4 or 4', said springs urging the armatures away from the corresponding windings as shown in Fig. 2. The forked end of each armature drives a corresponding star-shaped wheel, 5 or 5' as the case may be, said star-shaped wheels being coaxially rigid respectively with the sunwheels 6 and 6' of the sun and planet gear 22 of the meter $c$. The actuation of the wheels 5 and 5' and consequently of the sunwheels is performed in opposite directions and the planet wheel 7 of the sun and planet gear 22 thus controlled meshes with a toothed wheel 8 driving a wheel 9 rigid with the pinion 10 of the gearwork of the meter, said wheel 9 driving into rotation the metering drums or wheels 11 to 14. Thus, the winding 1 being fed with current, the wheel 9 is driven through the agency of the sun and planet gear in the direction of the arrow 15 (Fig. 3), i.e. in the positive direction corresponding to the totalization of the figures carried by the metering wheels. When, in contradistinction, the winding 1' is energized, the wheel 9 is driven in the opposite direction and the metering wheels execute a negative totalization, in other words, a subtraction.

The metering drums or wheels 11 to 14 are rigid with cams referenced as 11' to 14', each cam acting on one of the rollers 16 mounted on a spindle 17 carried at the end of a rocker member comprising an arm 18 pivotally secured at 19 to a stationary point and rigid with an arm 20 controlling a switch 21. The pivotal axis of the rocker member is parallel with the axis of drums 11 to 14 and the rollers 16 are coaxial with spindle 17 (Figs. 2 and 3). When the drums or wheels 11 to 14 are in their zero position, the notches or receding portions of the cams 11' to 14' have receded to a maximum with reference to the rocker member and are in alignment and the switch 21 is open, while it is closed for any other position of the metering drums or wheels. Thus, the switch 21 is kept closed by any of said wheels 11 to 14 which is not in a zero position and is opened only when said wheels are all in their zero position. A conventional carry over mechanism is inserted as usual between the wheels 11, 12, 13 and 14 to operate for either direction of rotation; but this carry over mechanism is not illustrated since it is well known per se and forms no part of the invention.

The winding 1 of the differential meter $c$ being controlled by the meter $a$, the metering wheels 11 to 14 of its gearwork show at the end of the predetermined metering period the number of impulses received by the differential meter $c$ for instance 53.

The winding 1' is connected with an impulse transmitter $d$ which acts also on a remote metering instrument $e$. At the moment of the reading, i.e. at the end of the predetermined period, the transmitter $d$ is started and it produces through the winding 1' of the meter $c$ a rotation in the opposite direction of the metering wheels 11 to 14 of its gearwork, this procedure continuing up to the moment at which the said wheels have returned to zero because at this moment the switch 21 inserted in the circuit controlling the impulse transmitter opens and interrupts the reception of the impulses from $d$. The number of return to zero impulses thus transmitted is counted by a meter $e$ the numeric indication given by which at the last reading, say 5710, is increased by the number of impulses transmitted by the meter $a$ to the meter $c$ during the period considered which number is equal to 53 and gives out consequently the total number 5763. It is to be noted that the impulses emitted by the counter $a$ during the return to zero of the differential meter $c$ are also registered by the totalizing instrument $e$ since electro-magnet 1 is acted upon by the impulses passing through it and let sunwheel 6 rotate completely independently of the rotation of sunwheel 6'.

What I claim is:

1. An arrangement for the remote measuring of the increase during a predetermined period of the numeric data of a meter controlled through impulses, comprising an intermediate differential meter including two windings, a sun and planet gear the sunwheels of which are controlled by the corresponding windings and a gearing controlled by the planet wheel of said sun and planet gear, means whereby the impulses acting on the impulse-controlled meter are transferred to the first winding, an independent impulse transmitter, a remote metering instrument, means operatively connecting the impulse transmitter with the second winding of the differential meter and with the remote measuring instrument to furnish simultaneously to the latter at the end of the period considered with a number of impulses equal to that of the metering impulses feeding the differential meter during said elapsed period as required for returning the gearing of the latter to zero and increasing the figure shown by the remote measuring instrument by an equal amount, and means whereby the return to zero of the differential meter switches off the transmission of impulses to said second winding and to the remote measuring instrument, the number of impulses transmitted being then equal to the precedingly defined number.

2. An arrangement for the remote measuring of the increase during a predetermined period of the numeric data of a meter controlled through impulses, comprising an intermediate differential meter including two windings, a sun and planet gear the sunwheels of which are controlled by the corresponding windings, a number of coaxial drums controlled by the planet wheel of said sun and planet gear and carrying the different figures corresponding to the different orders of units respectively and a cam rigid with each drum, a rocker member the axis of which is parallel with the axis of the drums, a plurality of rollers carried coaxially by said rocker member along an axis parallel with its rotary axis, said rollers engaging each the corresponding cam, a switch controlled by the rocking of said rocker member to be opened by the latter only when the drums are all in their zero positions and the corresponding cams have receded to a maximum with reference to the rocker member, means whereby the impulse-controlled meter feeds impulses to the first winding, an independent impulse transmitter, a remote metering instrument, means operatively connecting the impulse transmitter with the second winding of the differential meter and with the remote measuring instrument to furnish simultaneously to the latter at the end of the period considered with a number of impulses equal to that of the metering impulses feeding the differential meter during said elapsed period as required for returning the gearing of the latter to zero and increasing the figure shown by the remote measuring instrument by an equal amount, and electric circuit means controlled by said switch and allowing the independent impulse transmitter to be operative as long as the switch is closed.

References Cited in the file of this patent
UNITED STATES PATENTS

| | | |
|---|---|---|
| 2,403,873 | Mumma | July 9, 1946 |
| 2,482,610 | Burn | Sept. 20, 1949 |
| 2,551,656 | Breitenstein | May 8, 1951 |
| 2,722,379 | Hayek | Nov. 1, 1955 |
| 2,757,862 | Boyden et al. | Aug. 7, 1956 |